United States Patent [19]
Hessert

[11] 3,782,467
[45] Jan. 1, 1974

[54] METHOD FOR REDUCING GAS PRODUCTION

[75] Inventor: James E. Hessert, Bartlesville, Okla.

[73] Assignee: Phillips Petroleum Company, Bartlesville, Okla.

[22] Filed: July 26, 1972

[21] Appl. No.: 275,440

Related U.S. Application Data

[63] Continuation-in-part of Ser. No. 244,223, April 14, 1972, abandoned.

[52] U.S. Cl................. 166/261, 166/270, 166/288, 166/295
[51] Int. Cl...................... E21b 33/138, E21b 43/24
[58] Field of Search.................... 166/256, 258, 261, 166/270, 288, 292, 293, 294, 295, 300

[56] References Cited
UNITED STATES PATENTS

| | | | |
|---|---|---|---|
| 3,195,630 | 7/1965 | Fisher | 166/292 |
| 3,208,524 | 9/1965 | Horner et al. | 166/294 |
| 3,251,414 | 5/1966 | Willman | 166/294 |
| 3,285,338 | 11/1966 | Boston | 166/273 |
| 3,378,070 | 4/1968 | Wessler et al. | 166/294 |
| 3,421,584 | 1/1969 | Eilers et al. | 166/295 |
| 3,502,149 | 3/1970 | Pence | 166/294 |
| 3,583,167 | 6/1971 | Parks et al. | 166/294 |
| 3,614,985 | 10/1971 | Richardson | 166/294 |
| 3,658,129 | 4/1972 | Lanning et al. | 166/294 |
| 3,727,687 | 4/1973 | Clampitt et al. | 166/294 |

*Primary Examiner*—Marvin A. Champion
*Assistant Examiner*—Lawrence J. Staab
*Attorney*—Quigg and Oberlin

[57] ABSTRACT

A method for reducing gas permeability in a hydrocarbon bearing subterranean formation having zones of gas permeability and at least two penetrating well bores, comprising the injection into said zones of a basic pH aqueous-thickener slug containing an acidic responsive crosslinking system and acidifying the aqueous-thickener slug with carbon dioxide for plugging in situ the zones of gas permeability.

7 Claims, No Drawings

METHOD FOR REDUCING GAS PRODUCTION

This application is a continuation-in-part of application Ser. No. 244,223, filed Apr. 14, 1972 and now abandoned.

This invention relates to a method for reducing gas production. In another aspect, this invention relates to a method for plugging zones of high gas permeability contained in a hydrocarbon bearing subterranean formation which is penetrated by a well bore.

Fireflood combustion production methods known heretofore establish a combustion front within a hydrocarbon bearing formation adjacent an injection well. After the combustion zone is established, oxidant is continually delivered to the zone to support combustion of the in-place hydrocarbons. Combusting the hydrocarbons generates large volumes of combustion gases which force the in-place hydrocarbons through the formation to a distant production well. However, the gases from combustion that function as the driving force for the in-place hydrocarbons are produced upon reaching and entering the production well. This production of combustion gases lowers the formation pressure, and requires a great deal of equipment and power to treat, compress, and reinject thereby causing waste. Oftentimes in fireflooding production methods, excessive combustion gas production at offset producing wells is accelerated by the gas entering zones of high gas permeability contained in the subterranean formations. This fingering action of the pressurizing fireflood combustion gas or naturally occurring gas overloads the producing equipment of adjacent wells and reduces effective driving pressure used on the in-place hydrocarbons.

It is therefore an object of this invention to provide a method for reducing fireflood combustion gas production. It is another object of this invention to provide a method for plugging zones of high gas permeability contained in hydrocarbon bearing subterranean formations wherein fireflood production methods are utilized or where naturally occurring gas is causing undesirable high gas-oil ratios.

This invention provides a method for controlling gas production in a firefloooding system through the in situ plugging of hydrocarbon bearing formation gas permeability zones. In carrying out this invention, a basic pH aqueous slug of dissolved thickener, reducing agent, and reducible crosslinking agent are injected into the gas permeability zones. Naturally occurring carbon dioxide injected carbon dioxide or carbon dioxide and other combustion gases produced by the fireflood is brought into contact with the in situ aqueous slugs of dissolved thickeners. In the subterranean formation, some of the carbon dioxide dissolves in the reservoir brine and the aqueous slug media thereby lowering the pH of the aqueous slug of dissolved thickner to an acidic level. The carbon dioxide will continue to drop the pH of the formation brine as well as the thickener slug, thereby activating the combined acidic responsive reducing agents and reducible crosslinking agents resulting in gelation of the thickeners. Until the carbon dioxide arrives in the gas permeability zones wherein the thickener solution is injected, the solution will be of a lower viscosity and will not effectively reduce the oil permeability. The method according to the invention allows the aqueous slug of thickener having an extremely high concentration of thickeners to be placed in situ in the subterranean formation gas permeability zones.

A suitable sized slug of high concentrate (0.2 to 2 percent by weight) of various thickening agents which can be applied according to the method of the invention include thickened aqueous solutions of sucrose, glycerin, and a number of water-soluble polymers. These water-soluble thickening agents include modified starches, Xanthum gum obtained by the fermentation of starch-derived sugar (polysaccharides), alkyl and hydroalkyl cellulose derivatives, carboxyl-methyl cellulose, polyvinyl alcohol, polyvinyl pyrrolidone, polyacrylamide polystyrene sulfonates, ethylene oxide polymers, the various homologs of these polymers, and copolymers of two or more of these materials or copolymers of the aforementioned polymers with other polymeric substances. Partially hydrolyzed polyacrylamides having a molecular weight in excess of $1.0 \times 10^6$ and having from about 3 to about 85 percent of the amide groups thereof hydrolyzed to carboxyl groups, polysaccharides, and cellulosic polymers are preferred thickening agents according to the method of the invention. These thickeners are injected into zones of high gas permeability dissolved in an aqueous media. The aqueous dissolved thickener slug also contains acidic responsive reducing agents and a reducible crosslinking agent which are inactive under basic pH conditions. The aqueous thichener slug is maintained at a basic pH before and during injection into the gas permeability zones.

Compounds which can be used in the practice of this invention as suitable crosslinking agents are water-soluble compounds of polyvalent metals wherein the metal is present in a valent state which is capable of being reduced to a lower polyvalent state. Examples of such compounds include potassium permanganate, sodium permanganate, aluminum chromate, aluminum dichromate, the alkali metal chromates, the alkali metal dichromates, chromium trioxide, and the like. Sodium dichromate and potassium dichromate, because of availability, are the presently preferred metal-containing compounds for use as a crosslinking or gelation cation. The hexavalent chromium in the chromium compounds is reduced in situ to trivalent chromium by suitable reducing agents, as discussed hereinbelow. In the permanganate compounds, for example, the magnesium is reduced from +7 to +4 valence as in the compound $MNO_2$, or to +2 valence as in MnO.

Suitable reducing agents which can be used in the practice of the invention include a sulfur-containing compounds such as sodium sulfite, sodium hydrosulfite, sodium metabisulfite, potassium sulfite, sodium bisulfite, potassium metabisulfite, sodium sulfide, sodium thiosulfate, thioactamide; and non-sulfur-containing compounds such as hydroquinone, ferrous chloride, potassium iodide, hydrazine phosphite, and hydrazine dichlorate. Some of the above reducing agents act more quickly than others, for example, sodium thiosulfate usually reacts slowly in the absence of heat, e.g., requiring heat up to about 125° to 130°F. Other reducing agents react more quickly in an acidic media and are relatively inactive in a basic media, for example, potassium iodide. Therefore, those reducing agents such as potassium iodide which react in response to an acidic media are preferred reducing agents according to the method of the invention.

Brines utilized in the present invention as aqueous solvent for the thickener agents can contain a wide range of dissolved solid content, for example, from 800, 1200, 6000, 90,000 and 170,000 ppm dissolved solids. Fresh waters, of course, can be used in place of brines but normally brines are used according to the invention due to their availability from the subterranean formations. Crosslinking or gelation rates are frequently expedited when using brines of the formation as the aqueous media for the thickening agents. These oilfield brines commonly contain various amounts of sodium chloride, calcium chloride, magnesium chloride, an the like. Sodium chloride is usally present in the greatest concentration. The word "aqueous" is used generically herein and in the claims, unless otherwise specified, to include such brines, fresh water and other media which can be used in accordance with the present invention.

The aqueous slug of thickeners, reducing agents, and crosslinking agents are maintained at a basic pH of up to about 10 before and during injection into the zones of high gas permeability. The activity of the reducing agent is thereby decreased and maintained at a low level until the aqueous slug is in place in the gas permeability zone. An in situ fireflood can be established for hydrocarbon recovery and gelling the material with resultant carbon dioxide.

As the resulting combustion gas begins to pressurize the subterranean formation, carbon dioxide will flow in a fingering fashion through the gas permeability zones and come in contact with the in-place aqueous thichener slug. Under subterranean formation pressure conditions, a portion of the carbon dioxide dissolves in the reservoir brine and aqueous media of the thickener slug, thereby lowering the pH of the slug to an acidic level. The reducing agent activates therein reducing, for example, chromium +6 to chromium +3 valence which in turn crosslinks the thickener present. The combined action of the carbon dioxide, reducing agent, and crosslinking results in the gelation of in situ thickener, effectively plugging the hydrocarbon bearing subterranean formation zone of high gas permeability. The carbon dioxide can also be provided in the method of this invention by naturally occurring carbon dioxide or by injecting carbon dioxide into the formation and into contact with the gellable material.

The examples included hereinbelow illustrate in a laboratory fashion the method of the invention utilizing a carboxylmethyl cellulose thickening agent in solution along with a sodium dichromate crosslinking agent and a potassium iodide reducing agent at a pH of approximately 8. The aforementioned is included in Example I according to the method of the invention and can be compared with Example II which is not according to the method of the invention for analogy purposes.

EXAMPLE I

250 Milliliters of a 0.5 percent sodium carboxylmethyl cellulose solution with 0.5 gram of sodium dichromate ($Na_2Cr_2O_7 \cdot 2H_2O$) and 0.5 gram of potassium iodide were added to the solution and the combined admixture was placed in a pressure bomb. The pH of the solution was approximately 8. The bomb was sealed and evacuated. Sufficient carbon dioxide was injected into the bomb in order to bring the pressure up to 25 psig. In 4½ days the solution was gelled in a semisolid jelly-like mass.

EXAMPLE II

A solution identical to the solution of Example I was prepared. The prepared solution was sealed with 25 psig of air pressure. In 4½ days no noticeable gelling had occurred.

The Examples I and II fully demonstrate that at basic pH the reaction rate between potassium iodide and sodium dichromate is practically zero. The examples further demonstrate that the acidifying action of carbon dioxide on the aqueous media produces an acidic pH resulting in an accentuated rate of reaction between the potassium iodide and the sodium dichromate which resulted in the semisolid gellation of the carboxylmethyl cellulose thickener.

EXAMPLE III 250 ml of a solution of CMC9H mixed at a concentration of 5000 PPM in tap water was treated by the addition of 0.5 grams of KI and 0.5 grams of sodium dichromate. The treated solution was placed in a pressure bomb and a vacuum was placed upon it to remove any air trapped in the fluid. The bomb was then pressured to 20 psig with methane gas. The pressure was then increased to 25 psig with carbon dioxide gas. Total absolute pressure on bomb was 39.65 psia. Partial pressure of methane was $(34.65/39.65) \times 39.65$ or 34.65 psia. Partial pressure of $CO_2$ was 5 psia. The above synthesized gas mixture simulates a gas composition that might occur naturally in a hydrocarbon reservoir. The above solution remained fluid for a period of six days. On the morning of the seventh day the solution was noticeably thickened. By the end of ten days the solution was a gelatinous semi-solid.

What is claimed is:

1. A method for reducing gas permeability in a hydrocarbon bearing subterranean formation having gas permeability zones wherein the formation is penetrated by a well bore, comprising: injecting into the gas permeability zones a basic pH aqueous slug of dissolved thickener, an acidic media reactive reducing agent, and a reducible crosslinking agent; and contacting the basic pH aqueous thickener slug with carbon dioxide to cause gelling and crosslinking in situ the aqueous insoluble thickener in the gas permeability zones.

2. A method according to claim 1 wherein the thickener is selected from the group consisting of polysaccharides, alkyl and hydroalkyl cellulose derivatives, and partially hydrolyzed polyacrylamides; and the aqueous media is formation brine having up to 170,000 ppm of dissolved solids.

3. A method according to claim 1 wherein the reducible crosslinking agent is a reducible polyvalent metal compound selected from the group consisting of potassium permanganate, sodium permanganate, aluminum chromate, aluminum dichromate, alkali metal chromates, alkali metal dichromates, and chromium trioxide; and a reducing agent which is activated by an acid media.

4. A method according to claim 2 wherein the thickener concentration varies form 0.2 to 2 percent by weight of the aqueous slug and said slug has a basic pH of up to 10 until injected.

5. A method according to claim 1 where carbon dioxide is injected into the formation and into contact with said thickener.

6. A method according to claim 1 including:

establishing an in situ fireflood within the formation; and passing resultant carbon dioxide from the fireflood into contact with said thickener.

7. A method according to claim 1 wherein the carbon dioxide is naturally occurring carbon dioxide in the formation.

* * * * *

UNITED STATES PATENT OFFICE

CERTIFICATE OF CORRECTION

Patent No. 3,782,467                                                             Dated: January 1, 1974

James E. Hessert

It is certified that error appears in the above-identified patent and that said Letters Patent are hereby corrected as shown below:

Column 4, line 61, delete "form" and insert therefor -- from --.

Signed and sealed this 30th day of April 1974.

(SEAL)
Attest:

EDWARD M. FLETCHER, JR.
Attesting Officer

C. MARSHALL DANN
Commissioner of Patents